3,421,898
PRODUCT AND PROCESS OF FEEDING RUMINANTS FEED CONTAINING ETHOXYLATED ALCOHOLS TO PROMOTE GROWTH
Eugene S. Erwin, Tolleson, Ariz., and Gino J. Marco, Webster Groves, Mo., assignors to Monsanto Company, St. Louis, Mo., a corporation of Delaware
No Drawing. Continuation-in-part of application Ser. No. 286,172, June 7, 1963. This application Dec. 20, 1966, Ser. No. 603,183
U.S. Cl. 99—2                                 10 Claims
Int. Cl. A23k 1/16

ABSTRACT OF THE DISCLOSURE

The growth of ruminants is stimulated by feeding the ruminants a feed composition containing an ethoxylated alcohol of the formula $$R\text{—}O(CH_2CH_2O)_nH$$

wherein R is alkyl of at least 9 and not more than 20 carbon atoms and $n$ is an integer of at least 2 and not more than 20.

---

This application is a continuation-in-part of copending United States application Ser. No. 286,172 filed June 7, 1963, now abandoned.

This invention relates to novel animal feed compositions, and particularly compositions for optimum feeding of ruminants. More specifically, the invention involves the incorporation of additives which will affect the rumen microflora and promote a more efficient use of the nutrients in normal feeds.

According to the present invention, it has been found that the addition of a small amount of an ethoxylated alcohol to conventional ruminant diets stimulates the rumen microflora and results in improved animal growth and better feed efficiency.

Useful ethoxylated alcohols according to this invention are those of the following formula $$R\text{—}O(CH_2CH_2O)_nH$$

wherein R is an alkyl group of 9 to 20 carbons and wherein $n$ is an integer from 2 to 20. These ethoxylated alcohols are prepared by adducting an alcohol with ethylene oxide or can be synthesized by other known methods.

In studying the effect of the various proposed additives for ruminant feeds, the development of data by feeding sheep or cattle is prohibitive both with respect to time and space requirements. Furthermore, the feed consumption of the animals is such that meaningful data could only be obtained by expending very large quantities of feed and unreasonable amounts of the proposed additives.

It has been known that the chemical compositions of the rumen fluids will reflect the well being of the ruminant and will provide a means of ascertaining the feed efficiency, the weight gain of the animal, and the adequacy of the feed. Rumen fluids contain a substantial proportion of volatile fatty acids, including acetic, propionic and butyric acids. These acids are derived from carbohydrate fermentation by rumen microflora and provide the principal source of energy to the animal. Of these fatty acids, the propionic acid content is most indicative of feed efficiency and weight gain. Increases in this component will be reflected immediately by improved feed utilization by the ruminant. These chemical changes in the rumen fluids can be measured by withdrawing samples of the fluid and determining the propionate content by chemical analysis. However, this procedure is also prohibitive because of the quantity of feed consumed and the size of the experimental adjuvant samples required.

It has been discovered that small scale in vitro experiments will enable the study of the effect of feed additives without requiring a large number of animals or an unreasonable quantity of the feed components. It has also been found that these in vitro experimental data can be corroborated by in vivo experiments. Furthermore, the correlation of rumen fluid analysis and growth stimulation has been well established.

The in vitro experiments are fermentation reactions in which the conditions existing in the rumen are simulated. The test additive (534 mg.) is dissolved in 5 to 10 ml. of acetone or methylene chloride and mixed with 2 grams of a standard substrate (68% corn starch, 17% alphacellulose, and 15% soybean meal). The mixture is evaporated in a nitrogen atmosphere with constant stirring to provide a substrate coated with the test additive. A portion of the coated substrate (119 mg.) is mixed with 300 mg. of uncoated substrate and charged to 50 ml. Erlenmeyer flasks. Rumen fluid from a fasted sheep (22 to 23 hours) is taken, filtered through four layers of cheesecloth and 10 ml. of the fluid charged to each flask. A buffer solution of the following composition is prepared and adjusted to pH 6.8 with aqueous 4 N HCl.

Buffer solution in grams per liter

| | |
|---|---:|
| $NaH_2PO_4$ | .316 |
| $KH_2PO_4$ | .152 |
| $NaHCO_3$ | 2.260 |
| $KCl$ | .375 |
| $NaCl$ | .375 |
| $MgSO_4$ | .112 |
| $CaCl_2$ | .038 |
| $FeSO_4 \cdot 7H_2O$ | .008 |
| $MnSO_4$ | .004 |
| $ZnSO_4 \cdot 7H_2O$ | .004 |
| $CuSO_4 \cdot 5H_2O$ | .002 |
| $CoCl_2$ | .001 |

Approximately 10 ml. of the above buffer solution are added to each flask.

The flasks are purged with nitrogen, stoppered with pressure release valves and heated at 39°±0.5° C. on a water shaker bath. The fermentation mixtures are then incubated for 16 hours and analyzed to determine the propionate change, as increase or decrease in weight percent.

EXAMPLE 1

Using the above described techniques in measuring the effect of feed additives or normal ruminant diets, a wide variety of alcohols condensed with ethylene oxide were studied to determine the increase of propionic acid induced by the rumen microflora in the presence of the ethoxylated alcohols. The results of this study are shown in the following table.

| Alcohol | Mols of EO | Propionate |
|---|---|---|
| n-Octyl | 5.2 | −0.6 |
| Do | 15.0 | −0.6 |
| n-Decyl | 7.5 | 10.6 |
| Do | 29.7 | −1.3 |
| Normal alcohols having an average of 10 carbon atoms | 4 | 11.8 |
| Dodecyl alcohol | 1 | 0.7 |
| Do | 3 | 7.2 |
| Do | 7.5 | 15.4 |
| Do | 25 | −0.6 |
| Mixed normal alcohols having an average of 12 carbon atoms | 4 | 15.5 |
| n-Tetradecyl alcohols | 8.1 | 12 |
| Do | 15 | 14 |
| Do | 29.8 | −1.9 |
| Mixed normal alcohols with an average of 14 carbon atoms | 4 | 10.4 |
| n-Hexadecyl | 4 | 4.5 |
| Do | 20 | 7.3 |
| Octadecyl | 14.7 | 4.7 |
| Mixed normal alcohols with an average of 18 carbon atoms | 4 | 2.5 |
| Mixed normal alcohols having 12 to 15 carbon atoms | 4 | 12.6 |
| Mixed normal alcohols having 11 to 16 carbon atoms | 4 | 12.6 |
| Alcohols having 11 to 16 carbons | 10 | 13.8 |
| Undecyl (branched) | 5.1 | 14.3 |
| Do | 14.8 | 7.1 |
| Do | 30 | −0.5 |
| Dodecyl (branched) | 7.6 | 8.6 |
| Tridecyl (branched) | 5 | 9.0 |
| Do | 7.5 | 10.8 |
| Do | 20 | 5.0 |
| Tetradecyl (branched) | 15 | 7.7 |
| Hexadecyl (branched) | 5 | 7.3 |
| Do | 10 | 10.7 |
| Do | 29.9 | 5.6 |
| Heptadecyl (branched) | 5 | 11.3 |
| Do | 10.2 | 9.5 |
| Do | 15 | 11.5 |
| Eicosyl (branched) | 7.4 | 2.9 |
| Do | 15.1 | 4.8 |
| Do | 39.2 | 3.0 |

EXAMPLE 2

Determination of propionic acid content of rumen fluids was measured in vivo by withdrawing rumen samples from sheep fed a mixed corn and hay diet and analyzing the fluid. The propionic acid content when the feed contained two percent of tridecyl alcohol ethoxylated with 9.2 mols of ethylene oxide was 183% of that of a control experiment not containing the additive.

EXAMPLE 3

Using the procedure of Example 2, the propionic acid content when the feed contained 1 percent of dodecyl alcohol ethoxylated with 3 mols of ethylene oxide was 161% of that of a control experiment not containing the additive. An in vitro experiment with the same additive showed a 7.2 percent increase in propionic acid content.

The ethoxylated alcohols within the scope of this invention affect the rumen microflora and promote a more efficient use of the nutrients in conventional feeds. The ethoxylated alcohol is mixed with a ruminant feed by any conventional means. This can be done by dispersing the ethoxylated alcohol with some of the grain, such as, corn or with other components of conventional feeds such as soybean meal, bone meal, vitamins and the like. The mixture can then be further mixed in a proper proportion with the feed.

The amount of the active compound added to the animal diet will depend upon the attendant circumstances and the nature of the effect desired. The preferred level of the ethoxylated alcohol is from 0.1 to 2 percent, based on the total weight of the feed.

It is to be understood that a ruminant feed concentrate consisting of an ethoxylated alcohol within the scope of this invention and a carrier can be conveniently used for incorporation in feeds. The ethoxylated alcohol is present in the concentrate in sufficient quantity to give the desired ratio of the ethoxylated alcohol to feed in the final composition fed to ruminants. The carrier present in the feed concentrate of this invention may be any conventional carrier known in the feed industry to be employed in feed supplements. Illustrative of the carriers which may be employed in the novel feed concentrates are soybean meal, corn oil, ground corn cobs, barley, wheat, mineral mixtures, diatomaceous earth and the like.

An essential component in ruminant feeds is the cellulosic roughage component. By the expression "cellulosic roughage," it is intended to refer to any nutrient component which contains at least 5% fiber. The fiber is principally cellulose which may also contain lignin chemically bound thereto. Typical fiber containing feeds include hay, straw, cottonseed hulls, cotton mill wastes, beet pulp, silage, ground corn cobs, corn stalks, oats, barley, cereal brans, and cereal middlings. One or more of these cullulosic roughage components is essential in balanced ruminant feeds and at least 0.5% by weight is included and as much as 60% or more may be used. However, in some areas cattle are fed with diets consisting essentially of barley and/or oats or substantially entirely of these high fiber cereals.

In the preparation of ruminant feeds at least one cellulosic roughage component is used and this component is preferably present in excess of 2% by weight although it may greatly exceed this preferred minimum content. These fiber containing components are conventional in ruminant feeds, and are desirable because of their high fiber content and because the ruminant animal has the ability to digest such cellulosic components.

The ruminant feeds may contain natural oils including animal fats, such as beef tallow, mutton tallow; fish oils including eel, herring, menhaden, tuna and salmon oil; and whale oil. The vegetable oils are usually of higher unsaturated acid content and are therefore generally liquid, for example soybean oil, sunflower oil, olive oil, safflower oil, corn oil, peanut oil, cottonseed oil, rice oil, millet oil, wheat germ oil and palm oil. Any of these may be included in the feed.

An optional component of the animal feeds is a nontoxic antioxidant. These substances tend to preserve vitamins and the unsaturation in oils by preventing the oxidation which normally occurs during the preparation, storage and use of the animal feeds. In the feed composition the use of from 0.001 to 0.1% by weight of the non-toxic antioxidant has been found to enable the stabilization of the unsaturation and to preserve the nutrient value of the feed during preparation, storage and use of the ruminant feed. Preferred usage involves the addition of from 0.005 to 0.05% of the non-toxic antioxidants.

Complete balanced feeds may contain, if desired, in addition to cellulosic roughage, natural oils and antioxidants, other components for example minerals, such as bone meal, salt and the various trace minerals including salts of zinc, copper, manganese, magnesium, cobalt, iodine and iron. Antibiotics, steroids, anthelmintics and other medicants may be used. Various vitamins, particularly A, B, E and D complexes may be added to provide deficiencies in these vitamins incident to the selection of the various components of the complete feed. Stilbestrol is another optional component. Other basic nutrients such as casein, other milk by-products, and synthetic chemicals such as urea, may be used if desired or if they are necessary to satisfy the requirements of the complete feed.

Although the benefits of the invention are described with respect to specific examples, it is not intended that the details thereof should be limitative except to the extent that they are encountered in the following claims.

The embodiments of the invention in which an exclusive property or privilege is claimed are defined as follows:

1. A ruminant feed which comprises a cellulosic roughage component and a growth promoting amount of an ethoxylated alcohol of the formula

$$R\text{---}O(CH_2CH_2O)_nH$$

wherein R is alkyl having at least 9 and not more than 20 carbons and $n$ is an integer of at least 2 and not more than 20.

2. A ruminant feed according to claim 1 wherein said feed further comprises at least one component selected from the group consisting of natural oils, antioxidants, vitamins and minerals.

3. A ruminant feed according to claim 1 wherein said ethoxylated alcohol is present in a proportion of about 0.1 to about 2.0 percent by weight based on the total weight of the feed.

4. A ruminant feed according to claim 1 wherein said ethoxylated alcohol is a decyl alcohol ethoxylated with about 7.5 mols of ethylene oxide.

5. A ruminant feed according to claim 1 wherein said ethoxylated alcohol is a tridecyl alcohol ethoxylated with about 9.2 mols of ethylene oxide.

6. A ruminant feed according to claim 1 wherein said ethoxylated alcohol is a dodecyl alcohol ethoxylated with about 3 mols of ethylene oxide.

7. A ruminant feed concentrate which comprises a carrier selected from the group consisting of soybean meal, corn oil, ground corn cobs, barley, wheat, mineral mixtures and diatomaceous earth and from about 5 to about 50 percent by weight of an ethoxylated alcohol of the formula $$R-O(CH_2CH_2O)_nH$$

wherein R is alkyl having at least 9 and not more than 20 carbons and $n$ is an integer of at least 2 and not more than 20.

8. A method of stimulating the growth of ruminant animals which comprises feeding said ruminants a feed comprising a cellulosic roughage component and a growth promoting amount of an ethoxylated alcohol of the formula $$R-O(CH_2CH_2O)_nH$$

wherein R is alkyl having at least 9 and not more than 20 carbons and $n$ is an integer of at least 2 and not more than 20.

9. A method according to claim 8 wherein said feed further comprises at least one component selected from the group consisting of natural oils, antioxidants, vitamins and minerals.

10. A method according to claim 8 wherein said ethoxylated alcohol is a tridecyl alcohol ethoxylated with about 9.2 mols of ethylene oxide.

References Cited

UNITED STATES PATENTS 3,075,878   1/1963   Ziffer _____ 167—85

OTHER REFERENCES

Zimmerman et al., Handbook of Material Trade Names, 1953 Ed., p. 92, Industrial Research Service, Dover, N.H.

Morrison, Feeds and Feeding, 1956 Ed., Morrison Publishing Co., Ithaca, N.Y., pp. 549, 708, 663, 862, 944 and 976.

A. LOUIS MONACELL, *Primary Examiner.*

H. H. KLARE III, *Assistant Examiner.*